Sept. 7, 1965   C. A. BURDEN ETAL   3,205,339
ELECTRIC WELDING
Filed April 12, 1963

INVENTORS
CLIVE A. BURDEN
FRANK S. WYLIE
BY Aaron R. Townshend
ATTORNEY 3,205,339
ELECTRIC WELDING
Clive A. Burden and Frank S. Wylie, Newcastle-upon-Tyne, England, assignors to The British Oxygen Company Limited, a British company
Filed Apr. 12, 1963, Ser. No. 272,693
2 Claims. (Cl. 219—126)

This invention relates to electric welding, and in particular to the process known as electro-slag welding in which a consumable electrode is fed into a bath of molten slag supported in contact with a surface onto which metal from the electrode is deposited. The invention also relates to weld preparations for use in this process.

For the butt welding of vertically disposed plates by the electro-slag process it is customary to use plates with a "square" edge preparation and to space these vertically extending edges approximately one inch apart. The slag bath support members bear against the plates at both sides of the gap, and define with the plate edges a weld preparation of square or rectangular cross-section. The electro-slag process has many applications in the welding of thick plate but has not been suitable for the vertical butt welding of plate having a thickness of less than three-quarter of an inch, and in fact has rarely been found suitable for plate of less than one inch in thickness. This is mainly due to the fact that arcing has occurred between the electrode wire and an adjacent surface of the plates or of the slag bath support members if the distance therebetween has been reduced to less than one-half inch approximately. Arcing in this way causes damage to the slag bath support members, causes the process to become unstable, and causes loss of material from the slag bath.

In carrying out experimental work with this process we have found that if the weld preparation is not of the conventional square or rectangular cross-section then the circulation of molten slag material in the slag bath is changed and the electric current distribution is also changed. We have also found that with a suitable shape of weld preparation the electrode wire may be fed into the slag bath at a distance of less than the normal minimum of one-half inch from the nearest surface of the plates or of the slag bath support members undesired arcing between the electrode wire and that surface. This may be due to the formation of a relatively cold layer of slag between the downwardly moving electrode wire and the said surface, this colder layer of slag having a relatively higher electrical resistance. Consequent to making these discoveries we have been able to devise a method for the vertical butt welding of relatively thin plate, that is to say plate of less than one inch in thickness, more successfully by the electro-slag process.

According to the present invention, the electro-slag welding process may be used for the butt welding of relatively thin plates if the opposed edges of the plates are formed to produce together a weld preparation of V cross-section having an included angle of at least 60° and up to 120°, and if the welding wire is fed into the molten slag bath in the weld preparation at a distance which is less than one-half inch from the apex of the V cross-section but is more than the distance at which arcing to the plates or to the slag bath support member occurs during welding.

The distance at which arcing to the plates or to the slag bath occurs may vary according to the characteristics of the flux used to form the slag bath.

Two applications of the invention to the electro-slag butt welding of two relatively thin steel plates will now be described by way of example with reference to the accompanying drawing, in which.

Figure 1:
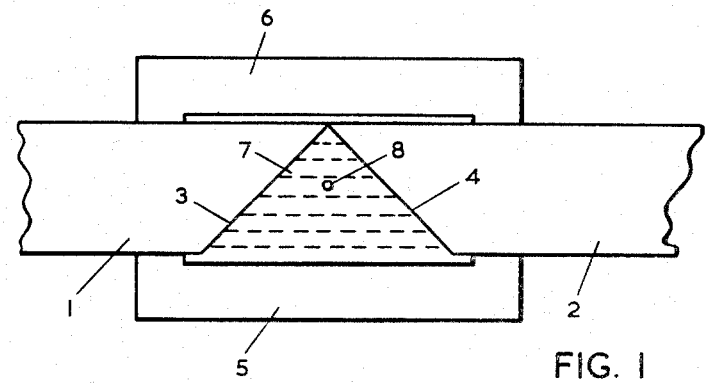
FIG. 1 is a diagrammatic top plan view, not to scale, of the weld preparation and molten slag bath.
Figure 2:
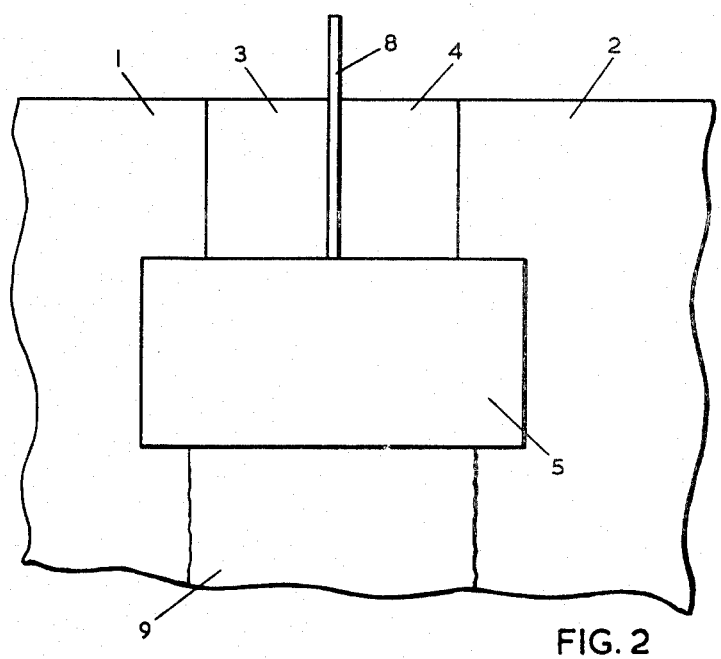
FIG. 2 is a side elevation of the plates shown in FIG. 1.

Referring to FIGS. 1 and 2, the opposing edges of the two plates 1 and 2 to be butt welded together were bevelled at an angle of 45°, and the plates were set up vertically in contact with one another with the plate edges 3 and 4 extending vertically and defining a weld preparation of V cross-section of 90° included angle. Conventional slag bath support members 5 and 6 consisting of water cooled copper shoes were set up on opposite sides of the plates 1 and 2, as shown.

A flux material of the fused type, such as is normally used for electro-slag welding of relatively thick plate, was used to produce the molten slag bath 7 (FIG. 1) in known manner and an electrode wire 8 was fed downwardly into the slag bath. Direct welding currrent was supplied, the electrode wire being of positive polarity. This electrode wire was directed into the slag bath at a point considerably less than the normal minimum half-inch distance from the plates 1 and 2 and in fact at a point close to the apex of the V and approximately three-sixteenths of an inch from the plates. In FIG. 2, the reference numeral 9 indicates solidified weld metal. Satisfactory electro-slag butt welds were produced in plates 1 and 2 of five-eighths of an inch in thickness.

In a second application of the electro-slag process according to the present invention, a similar V weld preparation was used but the slag bath 7 was formed by melting a flux material consisting of an unfused mixture of approximately equal proportions by weight of calcium silicate and calcium fluoride bonded with sodium or potassium silicates. Using this flux composition it was possible to butt weld thinner plates, of half-inch thickness, in the manner described above but with the electrode wire 8 positioned approximately one-eighth inch from the plates in proximity to the apex of the V.

What we claim is:
1. An electro-slag welding process for the vertical butt welding of relatively thin plates, and in which a consumable electrode is fed into a bath of molten slag supported in contact with a surface onto which metal from the electrode is deposited, wherein the opposed edges of the plates extend vertically and form together a weld preparation which extends vertically and is of V cross-section having an included angle of at least 60° and up to 120°, and wherein the consumable electrode is fed vertically downward into the molten slag bath in the weld preparation at a distance which is less than one-half inch from the apex of the V cross-section but is more than the distance at which arcing to the plates or to the slag bath support member occurs during welding.

2. An electro-slag welding process as claimed in claim 1, wherein the opposed edges of the plates form together a weld preparation of V cross-section having an included angle of approximately 90°.

References Cited by the Examiner
UNITED STATES PATENTS

| | | | |
|---|---|---|---|
| 1,782,316 | 11/30 | Robinoff et al. | 219—73 |
| 2,395,723 | 2/46 | Chmielewski | 219—137 |
| 2,511,976 | 6/50 | Frost | 219—73 |
| 2,686,134 | 8/54 | Wooding et al. | 17—65 X |

RICHARD M. WOOD, *Primary Examiner.*